June 3, 1958 L. A. WARREN 2,837,201
ELEVATOR
Filed July 14, 1953 6 Sheets-Sheet 1

INVENTOR
*Leondras A. Warren*
BY *Cushman, Darby & Cushman*
ATTORNEYS

INVENTOR
*Leondras A. Warren*

BY *Cushman, Darby & Cushman*
ATTORNEYS

June 3, 1958 L. A. WARREN 2,837,201
ELEVATOR
Filed July 14, 1953 6 Sheets-Sheet 3

INVENTOR
Leondras A. Warren
BY Cushman, Darby & Cushman
ATTORNEYS

June 3, 1958  L. A. WARREN  2,837,201
ELEVATOR

Filed July 14, 1953  6 Sheets-Sheet 5

INVENTOR
Leondras A. Warren

BY Cushman, Darby & Cushman
ATTORNEYS

June 3, 1958  L. A. WARREN  2,837,201
ELEVATOR
Filed July 14, 1953  6 Sheets-Sheet 6

INVENTOR
Leondras A. Warren
BY Cushman, Darby & Cushman
ATTORNEYS

United States Patent Office 2,837,201
Patented June 3, 1958

2,837,201

ELEVATOR

Leondras A. Warren, Omaha, Nebr., assignor to Valley Manufacturing Company, Valley, Nebr., a corporation of Nebraska Application July 14, 1953, Serial No. 367,896

4 Claims. (Cl. 198—98)

This invention relates to material handling apparatus, and in particular to improvements in material handling elevators of the endless conveyor variety. More specifically this invention relates to improvements in mobile elevators commonly used in the agricultural industry.

It is the primary object of this invention to provide an improved inexpensive mobile elevator which is safer to use, less fatiguing on the operator to adjust and operate, and is streamlined and compact in appearance.

Another object of this invention is to provide an improved elevator having a hopper pivotally secured to the elevator and so counterbalanced that the hopper may be raised or lowered with a minimum of effort.

It is another object of this invention to provide an improved hopper which is torsion spring loaded so as to require but a minimum constant torque effort to pivotally adjust this hopper.

It is still another object of this invention to provide an improved portable farm elevator which is easy to fabricate and applicable for multiple purposes.

It is a further object of this invention to provide an improved manually adjustable farm elevator which may be raised and lowered with far less fatigue to the operator than that experienced with presently available manually adjusted elevators.

It is a still further object of this invention to provide an improved elevator which has a maximum of movable parts safely enclosed for the protection of persons working about this elevator.

It is another object of this invention to provide an improved mobile undercarriage which is rugged, efficient, inexpensive and easy to maintain or repair.

It is yet another important object of this invention to provide an improved manually operated winch means secured to the undercarriage of this elevator which will enable an operator to raise or lower the elevator with equal facility whether the elevator be in a lowered or raised position.

It is still another important object of this invention to provide an improved two-speed winch, for adjusting elevation of the elevator, which is simple, easy to operate and provides maximum adaptability to the work load being adjusted.

Other objects and advantages of the invention will be apparent during the course of the following description.

In the accompanying drawings, forming a part of this application and in which like numerals are employed to designate like parts throughout the same.

Figures 1, 2:
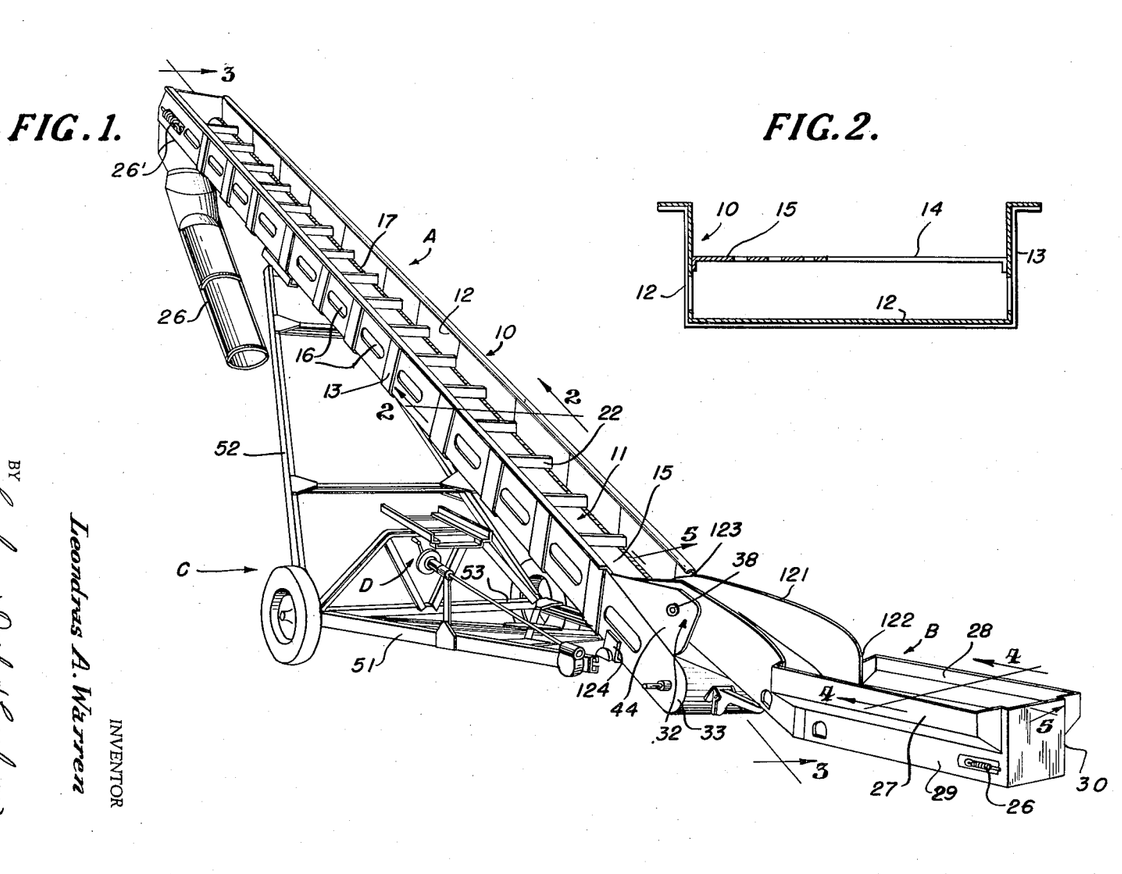
Figure 1 is a perspective view of a preferred embodiment of the invention showing the component parts of the elevator assembled together.
Figure 2 is a cross-sectional view of the elevator or trough taken on the line 2—2 of Figure 1.

A preferred embodiment of this elevator, as illustrated in the drawings, is comprised of four basic components, namely, an elevator endless conveyor A (Figure 1), a material receiving hopper B pivotally mounted and counterbalanced on one end of the conveyor; a mobile undercarriage C to which the lower end of the conveyor is pivotally secured; and the reduction gear system D used to manually adjust the elevation of the conveyor.

THE CONVEYOR

Figure 3:
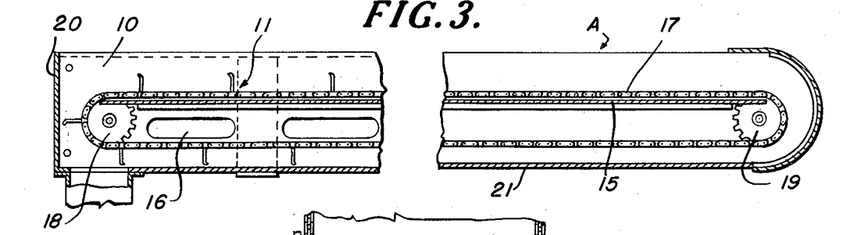
Figure 3 is a fragmentary sectional view of the elevator trough taken on the line 3—3 of Figure 1.
Figure 6:
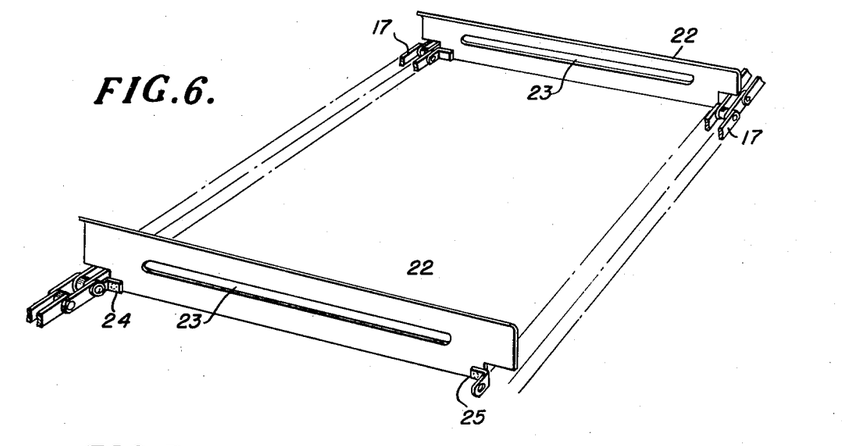
Figure 6 is a fragmentary perspective view of the elevator flights showing how they are secured to the endless chains on each side of the trough.

The conveyor A is comprised of a trough 10 (Figures 1, 2 and 3) and an endless conveyor 11 mounted to rotate in the trough. The trough (Figures 1, 2 and 7) is fabricated from U-shaped sections 12 which are bolted together by mating U-shaped girder plates 13 intermediate each trough section 12. These girder plates are braced by structural cross members 14. A work load supporting floor panel 15 is positioned intermediate the side walls of the conveyor trough 10 and integrally secured thereto, such as by rivets or bolts. This panel is spaced below the top edges of the trough and extends throughout its length. Each trough section has an opening 16 on each side for maintenance and to decrease the overall weight of the elevator. A pair of endless chains 17 (Figures 1, 3 and 6) mounted on sprockets 18 and 19 (Figure 3) are adapted for travel inside the trough adjacent the opposite sides for longitudinal forward movement above panel 15 toward the discharge end of the conveyor 20 and then for return movement intermediate the underside of panel 15 and the bottom 21 of the trough.

A series of die stamped flights 22 (Figure 6) with ribs 23 added for strength and rigidity, are secured to the opposite drive chains 17 at their respective adjacent end portions 24 and 25. Each flight is so connected with the drive chains that it is normal to these chains at all times, and perpendicular to the panel 15 when moving longitudinally intermediate the end portions of the trough. By securing these flights at right angles to the drive chains, optimum contact is made with material being moved by the conveyor and small grain is prevented from working back toward the bottom of the apparatus.

At the elevated portion of the conveyor 20, a swivel spout 26 (Figure 1) is secured for use when material of a comminuted nature is being handled. This spout is swivel mounted for 360° adjustment therein providing a material discharge to any side of the apparatus.

Figures 11, 12:
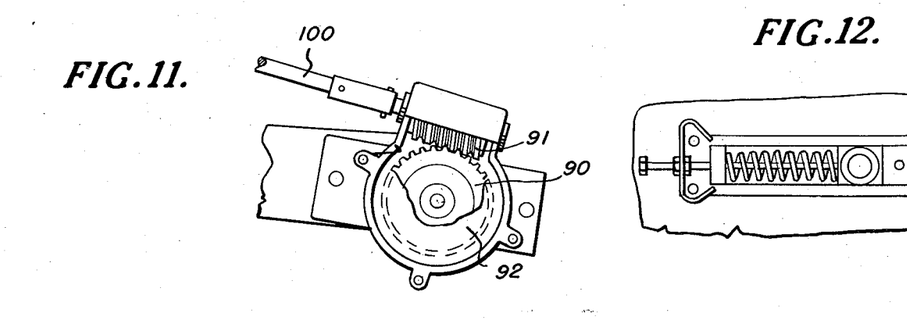
Figure 11 is a fragmentary elevational view of the gear means used to drive the elevator winch.
Figure 12 is an elevational view of the shock absorbing cushion springs used to mount the chain sprockets.

The uppermost idler sprockets 18 (Figure 3) are mounted on standard cushion spring shock absorbers 26' (Figures 1 and 12) to protect the apparatus against chain breakage should for any reason the conveyor become momentarily jammed. These shock absorbers will take up any sudden impact and will prevent either chain or chains from snapping.

With the exception of the movement of the flights on the upper side of the panel from the bottom to the top of the elevator, all moving parts are shielded from accidental contact by persons working around the elevator, thereby making this apparatus exceedingly safe to use.

THE HOPPER

Hopper B is pivotally connected to the lower end of the conveyor by novel counter-balancing means which will now be set forth more fully.

Figure 4:
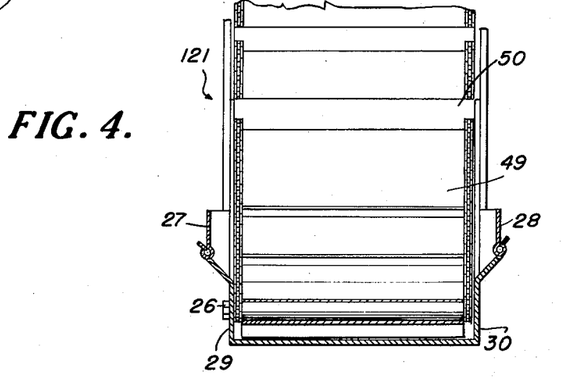
Figure 4 is a cross-sectional view of the elevator hopper taken on the line 4—4 of Figure 1.
Figure 5:
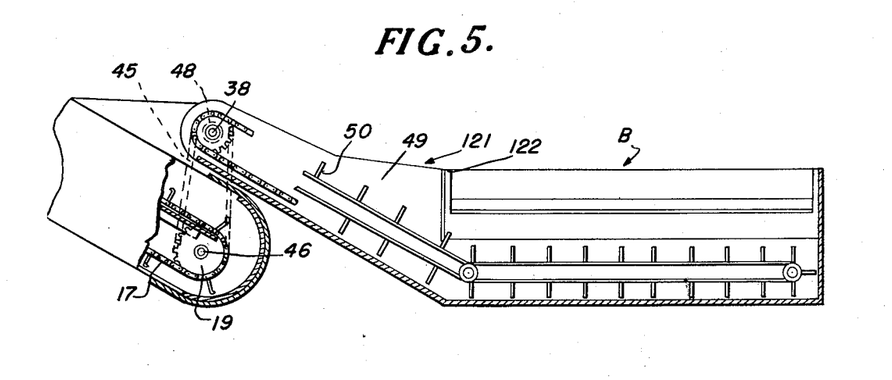
Figure 5 is a sectional side elevation of the elevator hopper taken along the line 5—5 of Figure 1.

The hopper (Figures 1, 4 and 5) is a rectangularly shaped material receiving box-like structure having the upper portions 27 and 28 of its sides pivotally hinged to the lower portions 29 and 30 respectively so that either or both upper portions may be lowered to facilitate loading the hopper from one or both sides.

In using the elevator to unload farm crops such as grain, hay or ensilage, the usual sequence of operations in locating the wagon with relation to the elevator is as follows: raising the hopper; locating the wagon with relation to the hopper so that the tail gate of the wagon is in front of the hopper when in the lowered position; and lowering the hopper. This sequence must usually be gone through each time the wagon is unloaded and it is therefore evident that the raising and lowering of the hopper entails a great deal of work if the weight of the hopper is not compensated for. This may be more appreciated when it is considered that the usual hopper supplied with elevators of this class weigh in the neighborhood of 200 pounds or more.

To eliminate the fatigue of manually lowering and raising such a hopper by means which not unsightly and inefficient, a pair of torsion springs 31 (Figure 8) having 1725° of coil are mounted and enclosed in compartments 32 (Figure 1) upon each side of the lower end 33 of the conveyor trough. The inside tips of the springs are turned 90° inwardly to form dogs 34, while the outside ends 36 are extended tangentially from the coiled portion to act as lever arms for energizing the springs. The inner coil of the spring fits around a steel collar 37 and this assembly is placed over the hub 38 of the hopper drive shaft bearing box 39. The collars 37 have notches or splines 35 to receive the dogs 34 projecting inwardly from the coil of the springs. The outside free ends of the coils may be secured between pins 40 and 41, or 41 and 42, which are integrally fastened to the inside walls 43 of compartments 32.

These pins 40, 41 and 42 provide means for adjusting the tension in the coils. For instance, the lower the pin with which the free ends of the coils are brought into bearing contact, the greater will be the tension in the springs. The securing of these free ends 36 locks the entire assembly in place, and cover plates 44 (Figure 1) are fitted to match compartments 32 so as to completely enclose the coiled torsion springs 31.

Figures 7, 8:
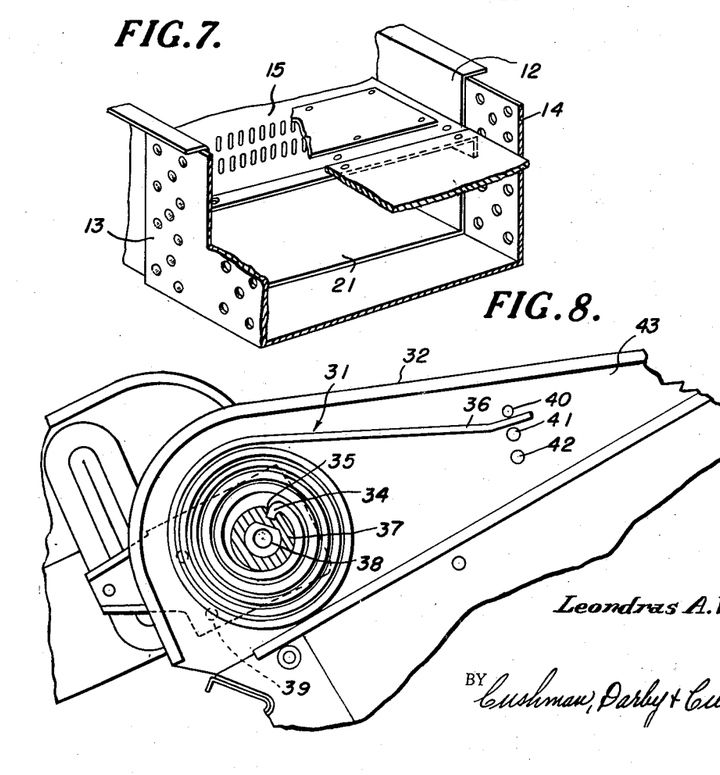
Figure 7 is a fragmentary perspective view of the elevator trough showing how the sections of the trough are braced and secured together.
Figure 8 is a side elevation of the torsion spring means employed to counter-balance the weight of the hopper.

With the position of the torsion springs as shown, to pivot the hopper downwardly will cause these springs to wind upon themselves, thereby storing energy. The resistance which these springs offer to such winding enables the hopper to be revolved downwardly with a very minimum of control or effort on the part of the operator. Likewise, once the coils have been wound tighter by the weight of the hopper when revolved downwardly, it requires only a slight upward pressure applied to the end of the hopper to cause it to rotate upwardly into its raised position, during which time the torsion springs unwind. These springs are so selected that only fingertip pressure is required to control the movement of the hopper up or down. Coiled torsion springs, being neat and easily enclosed for greater safety and appearance, are also mechanically superior to helical spring adaptations since the torque is fairly constant throughout the entire arcuate path of travel of the hopper. Commonly used helical extension springs exert sufficient torque for lifting only part way through the arcuate path, or must be so tensioned that too much torque is exerted during a portion of this movement whereby corresponding compensating back pressure must be applied by the operator. It is apparent, of course, that any compensating back pressure which must be applied to offset the force of the springs contributes to the fatigue of the operator and is for this reason objectionable.

A chain 45 (Figure 5) may be used to connect the conveyor drive shaft 46 with the hopper drive shaft 47 by sprocket means 19 and 48 so as to provide a power take-off which may be utilized to drive an endless belt 49 within the hopper B for feeding material therein onto the main endless conveyor 11 carried in the trough 10. Spaced flights 50 are secured normal to the belt 49 to assist in carrying material from the hopper to the elevator.

THE UNDERCARRIAGE

A satisfactory undercarriage of a portable farm elevator must perform three main functions well. It must serve as a transport means for the elevator so that the apparatus may be transported from place to place on the farm or between farms with facility; it must serve as a support for the trough while it is in use at various degrees of elevation; and it must provide a ready means for adjusting, raising and lowering the trough to any desired elevational angle.

The improved undercarriage provided with this apparatus has been designed to provide these three services in an improved manner and with a structure which is simple, rugged, inexpensive, and easy to maintain. This undercarriage C (Figures 1, 9 and 10) comprises a main frame 51, an elevating frame 52, a transverse structural member 53 intermediate the main frame and the elevating frame having stub axles 54 and 54' on opposite ends for mounting wheels 55 and 55' thereto. Both frames are made of structural members which are riveted or bolted together by bracing transverse structural members.

The elevating frame 52 (Figure 9) is comprised of a pair of channel members 56 and 57 with the free ends 58 and 59 converging towards the longitudinal axis of the frame and with the opposite ends 60 and 61 being pivotally secured to the stub axles 54 and 54'. A plurality of channel members 62 and 63 extend transversely between longitudinally extending members 56 and 57 and are riveted thereto by suitable gusset plates 64. The free ends 58 and 59 of this frame portion are joined by a shaft 67 upon which is pivotally mounted a bracket 68 carrying pairs of rolls 69 and 69' positioned for rolling engagement with the undersurface 21 (Figure 3) of the conveyor trough 10.

A trough rest 70 (Figure 9) made of U-shaped structural member 71, and braces 72 and 73, is rigidly secured to the top side of the transverse member 53 and extends at an inclined angle rearwardly toward the main frame 51 so as to be normal to the conveyor trough 10 when it is in the full lowered position. A pair of angle irons 74 and 75 are spaced apart and mounted with resilient shock absorbers to the top surface of U-shaped member 71 so as to receive the bottom portion 21 of the conveyor trough 10 therebetween when the trough is in its full lowered position.

Figure 9:
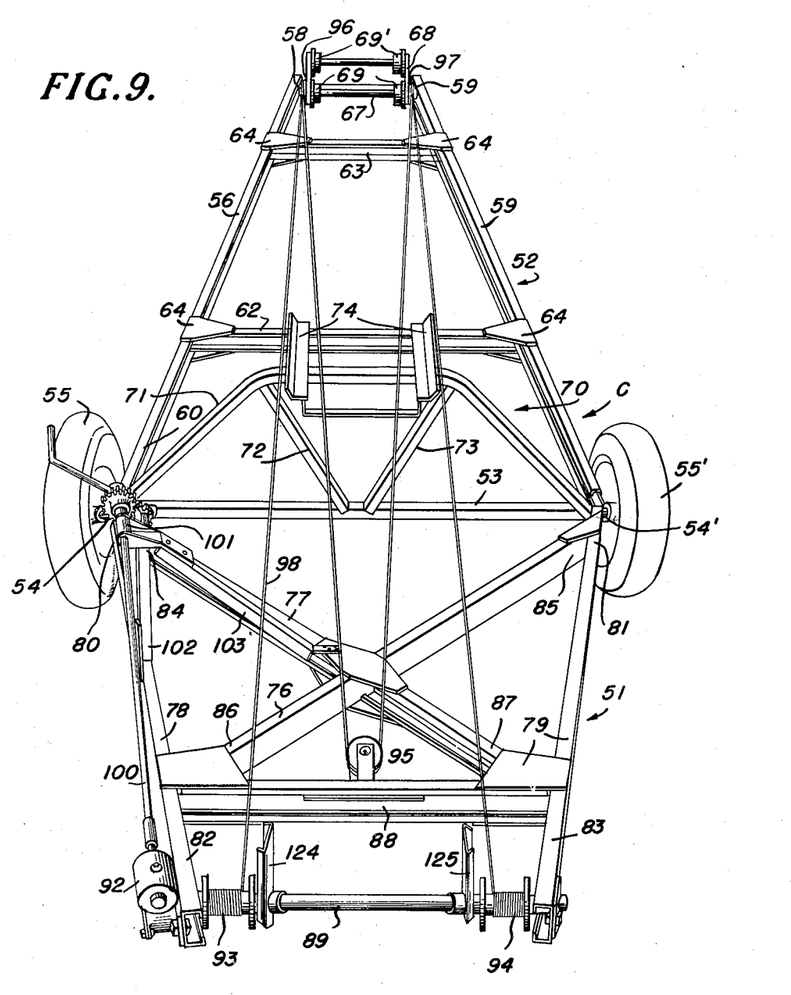
Figure 9 is a perspective view of the undercarriage of the elevator showing the pulley system used to control the elevation of the forward pivotal portion of the undercarriage.
Figure 10:
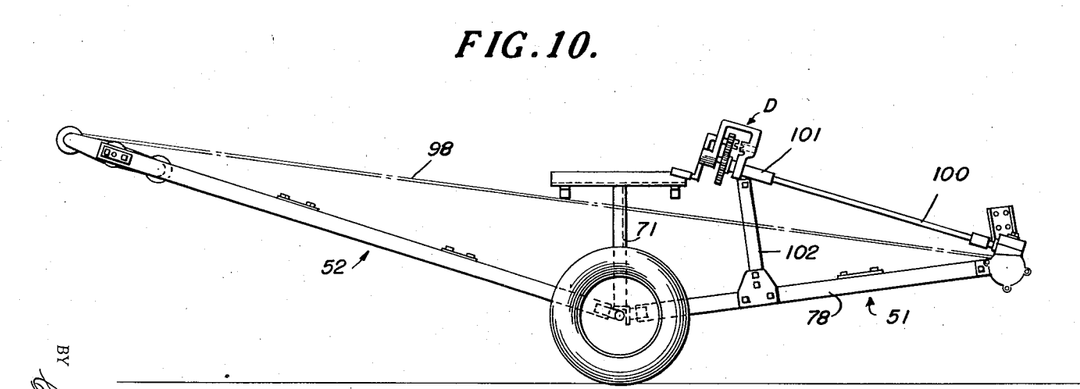
Figure 10 is a side elevation of the undercarriage shown in perspective in Figure 9.

The main frame is of the automobile chassis construction, having cross members 76 and 77 bolted to opposite sides of longitudinally extending channel members 78 and 79. The ends 80 and 81 of the channel members 78 and 79 are rigidly secured to the transverse member 53, and the opposite free ends 82 and 83 of these channel members converge rearwardly on the longitudinal axis of the main frame 51. The ends 84 and 85 of cross channel members 76 and 77 respectively are riveted to the channel ends 80 and 81 adjacent the end portions of the transverse member 53. The opposite ends 86 and 87 of these cross channel members are riveted to channel members 78 and 79 adjacent the intersection of transverse channel member 88 with channel members 78 and 79. The combination of cross members 76 and 77 and transverse member 88 provides a very rigid and durable frame adapted to withstand the forces applied thereto during the course of the use of the apparatus, and as will be set forth more fully hereinafter.

A winch shaft 89 extends transversely between the free ends 82 and 83 of channel members 78 and 79 and is rotatably secured thereto. A worm gear 90 (Figure 11) is keyed to one end of this winch shaft 89 for engagement with a worm wheel 91. These gears are housed in a casing 92 suitable to hold gear lubricants and to keep the gears free from the abrasive effects of dirt and other foreign matter.

Winch drums 93 and 94 (Figure 9) are mounted on opposite ends of the winch shaft 89 and secured thereto. A single sheaved pulley 95 is rotatably mounted on the side of transverse channel member 88 remote from said winch shaft. A pair of single sheaved pulleys 96 and 97 are rotatably mounted on opposite ends of the transverse shaft 67 which connects the free ends of the elevating frame 52.

A cable 98 connects the main frame 51 with the elevating frame 52. When the free ends of the cable 98 are wound upon the drums 93 and 94, the elevating frame 52 is caused to pivot upwardly about the axial stubs 54 and 54'. One free end of this cable 98 is secured to one of the drums 93 and is thereupon threaded through pulley 96. From pulley 96 the cable passes back to pulley 95 about which it is threaded and then returned forward to the pulley 97 on the elevating frame. Cable 98 is threaded about pulley 97, and finally returned to drum 94 where the other free end of the cable is secured.

With this combination of a cable and single sheaved pulleys, it is apparent that rotation of the winch shaft to which the winch drums are secured will provide the operator with a mechanical advantage of two, since each free end of the cable will wrap about its respective drum twice the length of the distance foreshortened between the drums and pulleys 96 and 97. An additional mechanical advantage is provided the operator of the elevator by means of the two speed reduction gear system D secured to the end of a crank rod 100. This system is adapted to actuate the worm gear assembly secured to the lower end of the winch shaft, as will now be described in greater detail hereinbelow.

REDUCTION LINK ASSEMBLY

This unit (Figures 10 and 11) comprises a worm wheel 91 concentrically mounted on and keyed to a crank rod 100 which extends rearwardly and upwardly for journaled engagement of its upper end in crank rod bearing 101. This bearing is positioned above main frame channel member 78 by means of upright channel support 102 for more convenient accessibility. An inclined bracing channel member 103 (Figure 9) is secured at its upper end to the upper end of upright channel 102 forming an apex, and at its lower end adjacent the juncture of cross brace channel members 76 and 77. Crank rod 100 enters crank rod bearing 101 on its lower end and extends somewhat beyond the opposite end of the crank rod bearing for engagement with bored end 105 (Figure 13) of U-shaped link 104. A sun gear 110 is rigidly secured to crank rod bearing 101 concentric with crank rod 100 which may turn freely within the sun gear, said crank rod and said sun gear being in axial alignment.

Figures 13, 13A, 14, 15:
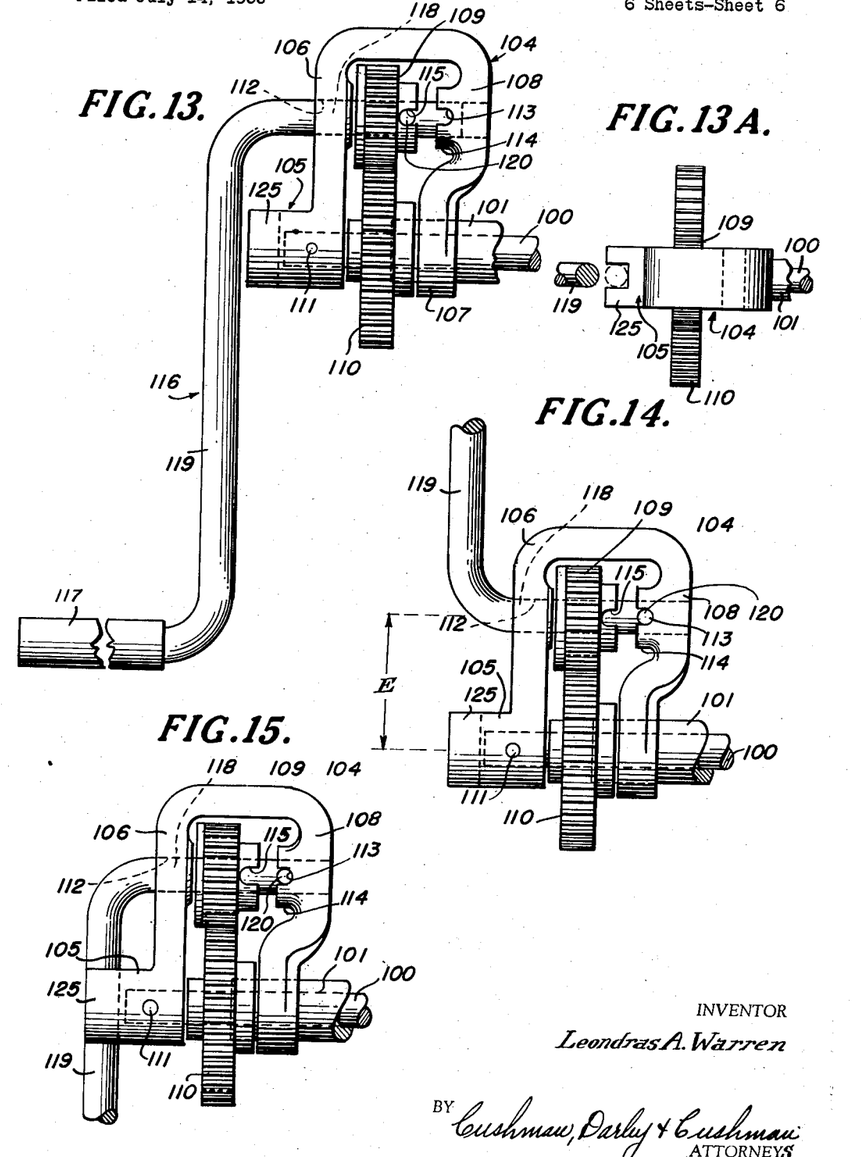
Figure 13 is an elevational view of the reduction link assembly used to drive the gear means of Figure 11, shown in one of three operative positions.
Figure 13A is a fragmentary plan view of the reduction link showing how the crank engages the bifurcated boss on one arm of the link.
Figure 14 is an elevational view of the reduction link assembly of Figure 13, shown in a second operative position.
Figure 15 is an elevational view of the reduction link of Figure 13, shown in a third operative position.

The U-shaped link 104 bridges the sun gear 110, and the end 105 of arm 106 is bored to receive the upper free end of the crank rod 100, as aforesaid, which is secured thereto such as by key or pin means 111. End 107 of the other arm 108 is rotatably mounted on the crank rod bearing 101. A planetary pinion gear 109 is also bridged intermediate the arms of link 104 and is rotatably positioned therein for meshing engagement with the sun gear 110.

Arm 106 has a hole 112 bored therein to provide a journal bearing in axial alignment with the axis of planetary pinion gear 109 when said gear is in meshing engagement with the sun gear. Opposite this journal bearing 112 in arm 106 and also in axial alignment therewith is provided a locking pin engagement slot 113 in an inwardly projecting boss 114 integral with arm 108. The face of the planetary pinion gear 109 adjacent this locking pin engagement slot 113 is also provided with a similar but opposite facing locking pin engagement slot 115. End 105 projects normally from arm 106 and the outermost portion is slotted in alignment with the longitudinal axis of the link 104.

A crank 116 (Figure 13) comprises a handle portion 117, a link journaled portion 118 parallel to the handle portion 117, and a lever portion 119 joining said handle portion and said link engaging portion on its opposite ends. The link journaled portion 118 is adapted to pass through and rotate in journal bearing 112 of arm 106 and also to pass through the center of planetary pinion gear 109 thereby providing a shaft upon which the planetary pinion gear may rotate. The free end of the link engaging portion is fitted with a locking pin 120 adapted to mate with either the locking pin engaging means 115 of the planetary pinion gear or the locking pin engaging means 113 of the reduction link 104.

The above described reduction link assembly provides a two speed winch operating mechanism having three crank handle positions, each position being appropriately suited for a specific elevation of the elevator conveyor trough, as will be hereinafter described.

*Position I*

In the first position of the crank handle (Figure 13) the locking pin 120 is placed in mating engagement with the locking pin engaging means 115 on the face of the pinion gear 109. This is done by sliding the link engaging portion 118 of the crank 116 outwardly away from link 104. In so doing, the lever portion 119 of the crank 116 (Figure 13A) is moved clear of the slotted portion 125 of end 105, whereupon rotation of the crank 116 acts directly upon the pinion gear 109 causing it to rotate about rigidly fixed sun gear 110.

The positive rotation of the planetary pinion 109 about the sun gear 110 exerts a torque on the link 104 whereby the end 107 of arm 108 rotates about the crank rod bearing 101. Since the free end of crank rod 100 is keyed or pinned to end 105 of the link arm 106, it follows that rotation of the link causes corresponding rotation of the crank rod. In addition to the mechanical advantage obtained by the cable pulley system above described, the rotation of the planetary pinion gear about the sun gear provides an additional mechanical advantage in proportion to their respective diameters.

*Position II*

A second position of the crank handle 116 (Figure 14) may be obtained by rotating the handle so that the lever portion 119 is 180° out of engagement with the slotted portion 125 of end 105. This rotation is done while the locking pin 120 of the link engaging portion 118 is secured in the planetary pinion gear slot 115. When the crank has been rotated 180°, as aforesaid, it may then be slid inwardly so as to bring the locking pin 120 into mating engagement with the locking pin engaging means 113 provided in the boss 114 on the inside face of arm 108. In this position no mechanical advantage is obtained through the gear train since the planetary pinion gear 109 merely idles on the link engaging portion 118 of the crank. However, in this position a mechanical advantage is obtained in that the lever has been effectively increased in length to include the length of the crank lever arm 119 plus the distance E (Figure 14) from the center of the journal bearing 112 in arm 106 to the center of the crank rod 100.

Position III

The third position of the crank handle (Figure 15) provides a direct drive of the crank rod 100, and is obtained by sliding the crank 116 inwardly so as to have the lever portion 116 engaged within the slotted portion 125 of end 105 and at the same time engaging the locking pin 120 with locking pin slot 113 of arm 108. With the crank 116 in this position each revolution of the crank will produce one revolution of the crank rod, the same as in Position II, but with a lighter load and a shorter crank lever arm, as in Position III, traversing of the elevator trough is done much more quickly.

Thus, it is readily apparent that when the greatest loads are encountered, the Position I shown in Figure 13 will be the logical speed to employ in adjusting the elevator. For intermediate load conditions a direct drive of the crank rod with an elongated lever arm will prove to be most advantageous. For the lightest load conditions where quick adjustment is desirable, the third position is the most useful, since this is the position which provides the shortest lever arm with a direct drive of the crank rod, whereupon the short lever arm provides means for rapid rotation of the crank rod.

THE ELEVATOR ASSEMBLY

Having now described the various subassemblies of this material handling apparatus, the assembly and operation of the device will now be more fully described.

The lower end 122 of a U-shaped companionway 121 (Figures 1, 4 and 5) is integrally secured to the forward end of the hopper B, and the forward end 123 (Figure 1) of the companionway is pivotally secured to the hubs 38 of the hopper bearing box. An endless belt 49 of this companionway 121 provides means for carrying material from the bed of the hopper B onto the endless conveyor 11. It is to be noted that this pivotal connection of the companionway to the conveyor trough is positioned over the material receiving end of the conveyor so that material may be transferred from hopper belt 49 to elevator conveyor 11.

A pair of brackets 124 and 125 (Figure 9) secured to the underside of the conveyor trough near the receiving end of the conveyor are adapted to pivotally engage the winch shaft 89 thereby securing the conveyor trough 10 and the hopper B to the undercarriage C. With the conveyor trough 10 pivotally secured to the winch shaft, the discharge end of the trough may now be placed for rolling engagement on the roller bracket 68. The pairs of rollers 69 and 69' are adapted to carry the bottom of the trough near the adjacent side portions, and are flanged or rimmed so as to prevent lateral shifting of the trough off of the roller bracket.

When the elevator trough 10 is in the full lower position the center of the trough is carried by the angle iron saddle 74 so that in this transporting position the trough is given three point support, the outer end by the roller bracket 68, the center by the angle iron saddle 74, and the material receiving end by the pivotal brackets 124 and 125.

The greatest weight to overcome is encountered when the elevator trough 10 is in the full lowered position. Accordingly, the two speed gear reduction link may be engaged in the first position above described and illustrated in Figure 13, whereupon a mechanical advantage is obtained by the positive engagement of the pinion gear 109 with sun gear 110.

The work required to elevate the trough 10 varies approximately as the cosine of the angle formed between the main frame 51 and the conveyor trough 10. After the conveyor trough has been traversed upwardly through the lower third of its arcuate path, the work required to continue this elevating movement progressively becomes less. This fact may be taken advantage of by shifting the crank to Position II whereby the same amount of expended energy will cause the elevator to be raised considerably faster.

As the conveyor trough approaches approximately the last third of its arcuate movement, even less work is required to continue this elevation and it is often useful and expedient to employ the third position of the crank which enables the operator to make faster adjustments of the trough with no greater expenditure of energy than that required initially to raise the elevator from its lowermost or middle position.

Finally, wheels 55 and 55' preferably of the pneumatic tire variety, are mounted on the stub axles 54 and 54' and the apparatus is then completely assembled and available for transportation from place to place.

Having described a preferred embodiment of this invention it may be appreciated that this invention provides an elevator which is rugged, adaptable to many uses, is of simple inexpensive construction, and having novel winching means equally adaptable to the many uses to which the elevator may be put.

This elevator is a great labor saver and is much less fatiguing to operate than presently available equipment, since the work expending features of this device have been so designed as to require but a minimum of energy contribution from the operator.

It is to be understood that the form of my invention, herewith shown and described, is to be taken as a preferred assembly of the same, in that various changes in the shape, size and arrangement of the parts may be resorted to, without departing from the spirit of my invention or the scope of the subjoined claims.

I claim:

1. In a material handling apparatus including a hopper assembly and an endless elevator conveyor assembly, means for pivotally mounting said hopper assembly on said conveyor assembly and for counterbalancing the weight of said hopper assembly so that pivotal movement thereof with respect to said conveyor assembly can be effected with little manual effort, said means comprising a pivot member rigidly carried by one of said assemblies and journalled in the other of said assemblies, said pivot member being apertured through its pivotal axis to receive a shaft forming a part of a conveyor means carried by said one assembly, and a torsion spring having an inner end fixed with respect to said pivot member, said torsion spring encircling the axis of said pivot member and having an outwardly extending end connected with the other of said assemblies.

2. In a material handling apparatus, an endless elevator conveyor having a pair of upstanding transversely spaced walls disposed at its lower end, a hopper having an endless conveyor assembly mounted therein, said assembly including a shaft journalled at one end of said hopper, transversely spaced pivot members rigidly mounted on said hopper and arranged to receive said shaft, said pivot members being pivotally mounted within the walls of said elevator conveyor, and a torsion spring adjacent each of said walls, each of said springs encircling a pivot member and having an inner end fixed thereto and an outwardly extending end connected to the adjacent wall of the elevator conveyor.

3. Apparatus as defined in claim 2 wherein each of the walls of said elevator conveyor is provided with a cover plate enclosing the adjacent torsion spring.

4. Apparatus as defined in claim 2 wherein the outwardly extending end of each of said torsion springs is adjustably connected between a series of spaced pins secured to the adjacent wall of said elevator conveyor.

References Cited in the file of this patent

UNITED STATES PATENTS

| | | |
|---|---|---|
| 722,788 | White | Mar. 17, 1903 |
| 921,685 | Feldt | May 18, 1909 |
| 959,679 | Wunder | May 31, 1910 |
| 981,580 | Mahoney | Jan. 10, 1911 |
| 1,114,112 | Cizek | Oct. 20, 1914 |
| 1,165,460 | Steele | Dec. 28, 1915 |
| 1,484,565 | Riker | Feb. 19, 1924 |
| 1,577,182 | Culver | Mar. 16, 1926 |
| 1,589,091 | Barber | June 15, 1926 |
| 2,310,364 | Haines et al. | Feb. 9, 1943 |
| 2,489,947 | Backart | Nov. 29, 1947 |
| 2,577,328 | Hyman | Dec. 4, 1951 |
| 2,604,203 | Neighbour et al. | July 22, 1952 |
| 2,760,622 | Magee | Aug. 28, 1956 |